(12) United States Patent
Bateman et al.

(10) Patent No.: US 12,718,713 B2
(45) Date of Patent: Aug. 25, 2026

(54) ADVERTISING SYSTEM

(71) Applicants: Matt Bateman, Delta (CA); David Robinson, Delta (CA)

(72) Inventors: Matt Bateman, Delta (CA); David Robinson, Delta (CA)

( * ) Notice: Subject to any disclaimer, the term of this patent is extended or adjusted under 35 U.S.C. 154(b) by 417 days.

(21) Appl. No.: 18/360,003

(22) Filed: Jul. 27, 2023

(65) Prior Publication Data

US 2025/0037616 A1 Jan. 30, 2025

(51) Int. Cl.
*G09F 7/18* (2006.01)
*G06Q 30/0251* (2023.01)
*G09F 21/04* (2006.01)

(52) U.S. Cl.
CPC ........... *G09F 7/18* (2013.01); *G06Q 30/0265* (2013.01); *G09F 21/048* (2013.01); *G09F 2007/1843* (2013.01); *G09F 2007/1865* (2013.01)

(58) Field of Classification Search
CPC .. G09F 7/18; G09F 21/048; G09F 2007/1843; G09F 2007/1865; G09F 21/00; G06Q 30/0265
See application file for complete search history.

(56) References Cited

U.S. PATENT DOCUMENTS 1,371,678 A * 3/1921 Gerken .................. G09F 21/04 248/689
1,468,672 A * 9/1923 Patten .................... G09F 21/04 40/591
3,173,219 A * 3/1965 Yarder .................... G09F 21/04 248/475.1
3,509,653 A * 5/1970 Hummel .................. G09F 7/18 40/200
3,584,407 A * 6/1971 Vrooman, Jr. .......... G09F 21/04 40/209
4,709,891 A * 12/1987 Barnett .................... G09F 7/18 248/231.71
5,255,464 A * 10/1993 Marecek .............. G09F 21/048 40/591
7,347,017 B2 * 3/2008 Shaffer, Jr. ............ G09F 21/048 40/606.03
7,444,773 B2 * 11/2008 Kolodziejczak, Sr. ...................... G09F 21/043 40/607.14
D583,712 S * 12/2008 Voss .............................. D20/39
(Continued)

*Primary Examiner* — Gary C Hoge
(74) *Attorney, Agent, or Firm* — Orin Del Vecchio

(57) ABSTRACT

An advertising system that includes three embodiments wherein the embodiments are all operably to be secured to commercial trucks such as but not limited to a dump truck or a transfer box trailer. The present invention utilizes a advertising support member across all embodiments that is manufactured from a rigid material and has desired advertising logos and indicia thereon. A transfer box tailgate embodiment is provided wherein this embodiment is configured to be releasably secured to a transfer box tailgate. Another embodiment provided in the present invention is a tarp rack embodiment wherein this embodiment is configured to secured to the rear of a transfer box trailer equipped with a tarp. A dump truck tailgate embodiment is provided wherein this embodiment releasably secures over the top edge of a tailgate of a conventional tailgate. The embodiments include locking members to inhibit unauthorized removal of the advertising support member.

6 Claims, 5 Drawing Sheets

(56) References Cited

U.S. PATENT DOCUMENTS

| | | | | |
|---|---|---|---|---|
| 8,061,761 | B1 * | 11/2011 | Sierra | B60J 11/06 296/136.01 |
| D662,443 | S * | 6/2012 | Voss | D20/19 |
| 9,015,972 | B1 * | 4/2015 | Morgan | G09F 21/048 40/591 |
| 9,449,536 | B1 * | 9/2016 | Sanner | G09F 7/18 |
| 2015/0043231 | A1 * | 2/2015 | Clark | F21S 43/00 362/485 |
| 2019/0141280 | A1 * | 5/2019 | Bottomly | B60R 11/0235 |
| 2021/0005115 | A1 * | 1/2021 | Johnson | G09F 21/04 |

* cited by examiner

ADVERTISING SYSTEM

FIELD OF THE INVENTION

The present invention relates generally to advertising techniques, more specifically but not by way of limitation, an advertising system that is provided in multiple embodiments wherein the present invention provides a technique to advertise of commercial heavy trucks, in particular dump trucks and lift gate trucks.

BACKGROUND

Outdoor media advertising is a heavy utilized advertising technique across North America. Advertisers attempt to promote their brand and capture a targeted audience with various alternate techniques that fall under outdoor advertising category. Billboards are heavily utilized and provide an opportunity to capture the attention of passing motorist. Other outdoor advertising techniques include signs on cargo trucks, typically the side of the cargo trailer of a commercial tractor trailer. These signs are typically painted and are located on the sides of the cargo trailer which can make the ability to view sometimes challenging based on a viewer's position relative to the side of the cargo truck.

There are many different types of commercial trucks operating on the roads which include large dump trucks and lift style haulers that are used for transfer of large loose materials. These trucks routinely travel in densely populated areas and as such, if outfitted with advertising media could potentially be a good platform to place advertisements thereon. The style of these trucks however make placing advertisements difficult. A good spot with a high capture rate is the rear of vehicles but the dump trucks have a configuration that currently the only manner to place advertisements thereon is through permanent techniques such as painting which is undesirable for various reasons.

Accordingly, there is a need for an advertising system that is configured to be operably coupled to a dump truck and other types of commercial trucks wherein the present invention provides a support platform allowing for placement of a support member that has advertising indicia thereon.

SUMMARY OF THE INVENTION

It is the object of the present invention to provide an advertising system that is provided in multiple embodiments wherein the present invention is configured to be releasably secured to dump trucks and similar style commercial trucks and transfer trailers.

Another object of the present invention is to provide an advertising system having embodiments configured to releasably secure to commercial trucks and trailers wherein an embodiment of the present invention is configured to releasably secure to a rear gate of a dump truck.

A further object of the present invention is to provide an advertising system that is provided in multiple embodiments wherein the present invention includes an embodiment configured to releasably secure an advertising support member to a transfer box trailer tailgate.

Yet a further object of the present invention is to provide an advertising system having embodiments configured to releasably secure to commercial trucks and trailers wherein the present invention includes an embodiment that secures to a truck or trailer having a tarp operable to be rolled over the top opening of the truck or trailer.

Still another object of the present invention is to provide an advertising system that is provided in multiple embodiments wherein the present invention wherein the embodiments of the present invention include an advertising support member that is releasably secured within the frame of the embodiments of the present invention.

An additional object of the present invention is to provide an advertising system having embodiments configured to releasably secure to commercial trucks and trailers wherein the frame of the embodiments of the present invention are configured to lockably secure to advertising support member.

Yet a further object of the present invention is to provide an advertising system that is provided in multiple embodiments wherein two of the embodiments include a frame configured to laterally adjust so as to be mounted in their desired location.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
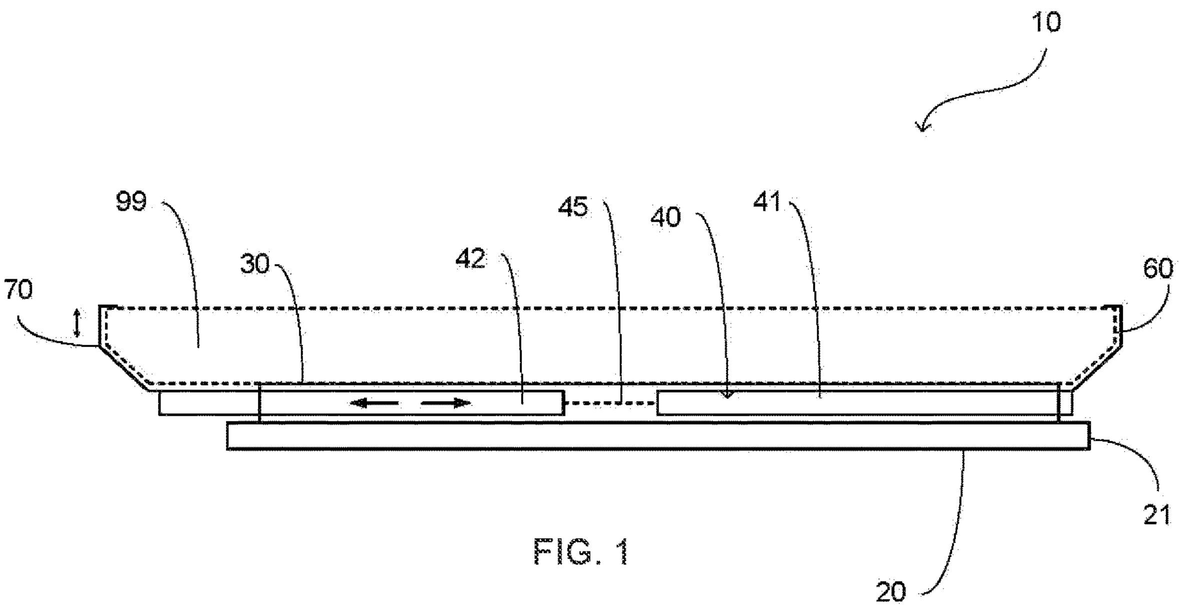
FIG. 1 is a top diagrammatic view of a transfer box tailgate embodiment of the present invention.

Referring now to the drawings submitted herewith, wherein various elements depicted therein are not necessarily drawn to scale and wherein through the views and figures like elements are referenced with identical reference numerals, there is illustrated an advertising system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 7:
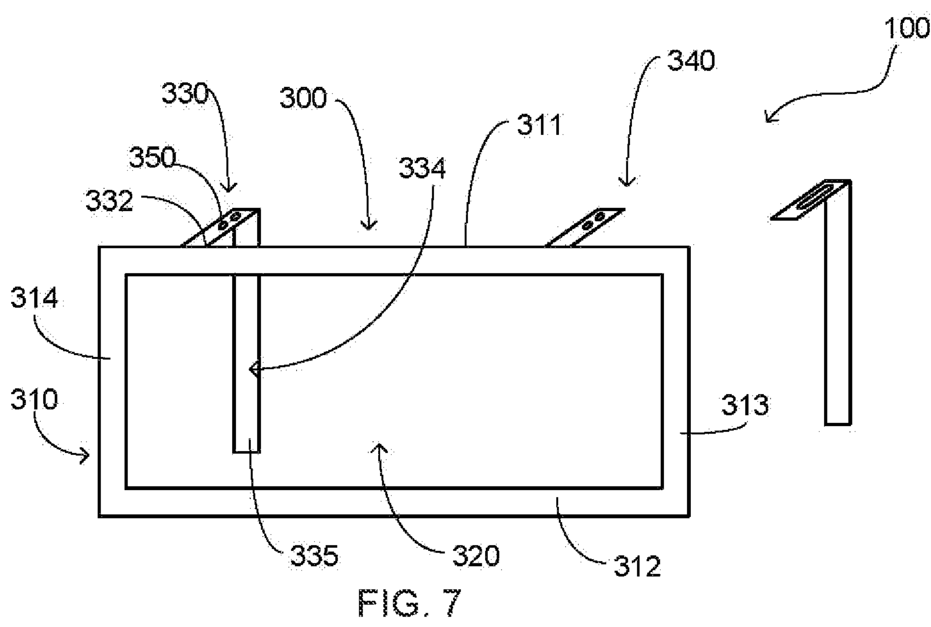
FIG. 7 is a diagrammatic rear perspective view of the dump truck gate embodiment of the present invention.
Figure 8:
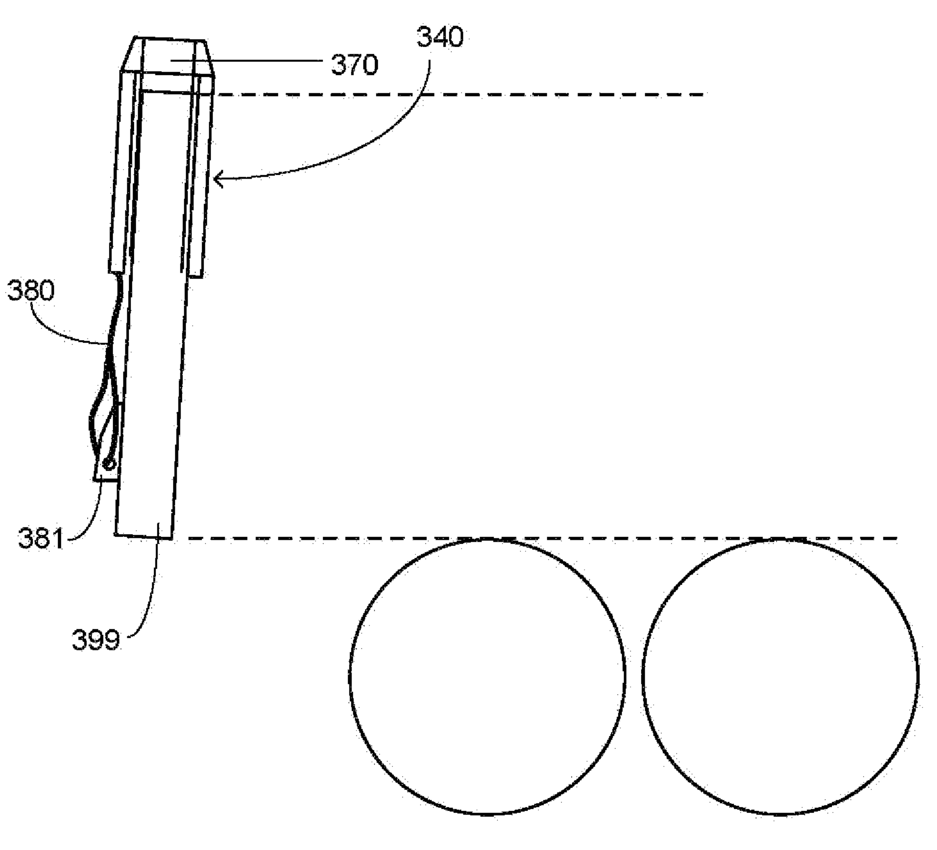
FIG. 8 is a diagrammatic side view of the dump truck gate embodiment of the present invention.

Referring in particular to the Figures submitted herewith, the advertising system 100 is provided in multiple embodiments in order to be operably coupled to the different exemplary commercial trucks and trailers discussed herein. It should be understood within the scope of the present invention the embodiments discussed herein could be manufactured from various suitable materials and incorporate adaptations for the intended application. Referring in particular to FIG. 7 and FIG. 8, the dump truck embodiment 300 of the advertising system 100 is illustrated therein. The dump truck embodiment 300 is configured to be releasably secured to the tailgate 399 of a conventional dump track. As is known in the art, dump truck tailgates are configured to hingedly open with the bottom moving away from the truck so as to allow materials to egress from the dump truck bed. The dump truck embodiment 300 has been configured to allow this movement and provide a technique of advertising on the rear of the dump truck.

The dump truck embodiment 300 includes a frame 310 wherein the frame 310 includes an upper horizontal member 311, lower horizontal member 312, first vertical support member 313 and second vertical support member 314 that are integrally secured to form the shape of the frame 310. The frame 310 includes a void 320 wherein the void 320 is configured to have an advertising support member 50 releasably secured therein. In a preferred embodiment the first vertical support member 313 and second vertical support member 314 are manufactured from metal C-channel wherein the configuration thereof provides an ability to slidably insert the advertising support member 50 into the frame 310 so as to display in void 320. It should be understood within the scope of the present invention that the frame 310 could be configured in alternate manners so as to releasably secure therein an advertising support member 50. The frame 310 is releasably secured to the tailgate 399 with the first attachment member 330 and second attachment member 340. The first attachment member 330 and the second attachment member 340 are identically constructed and are operable to secure the dump truck embodiment 300 over the upper edge of the tailgate 399. The first attachment member 330 includes first member 332 and second member 334. First attachment member 330 extends outward from the upper horizontal member 311. Second member 334 is perpendicular in form having a lower portion 335 that extends downward along the tailgate 399. The second member 334 is movable with respect to the first member 332 utilizing slot apertures 350 and fasteners (not particularly illustrated herein). Slot apertures 350 allow for adjustment of the second member 334 in order to bias against the inside surface of the tailgate 399 in order to secure the dump truck embodiment 300. It is contemplated within the scope of the present invention that alternate elements and/or techniques could be employed to secure the dump truck embodiment 300 to a tailgate 399. The embodiment of the dump truck embodiment 300 illustrated in FIG. 8 submitted herewith employs spring member 370 which facilitates the ability to move the second attachment member 340 inwards and outwards so as to clamp the dump truck embodiment 300 to the tailgate 399. The dump truck embodiment 300 further includes safety tether 380 that is secured to the frame 310 and securing member 381 to inhibit the dump truck embodiment 300 from disengaging the tailgate 399. While not particularly illustrated herein, it is contemplated within the scope of the present invention that the advertising support member 50 could be locked into position within the void 320 so as to inhibit unwanted removal thereof.

Figure 2:
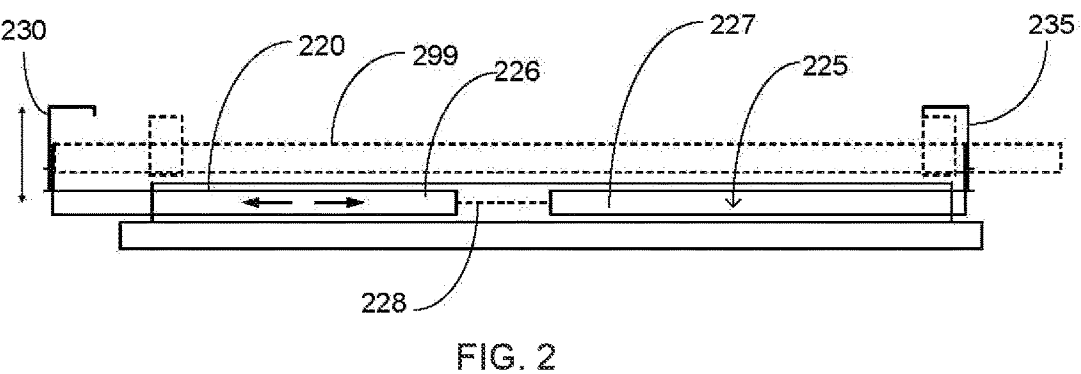
FIG. 2 top diagrammatic view of a tarp rack embodiment of the present invention.
Figures 4, 5:
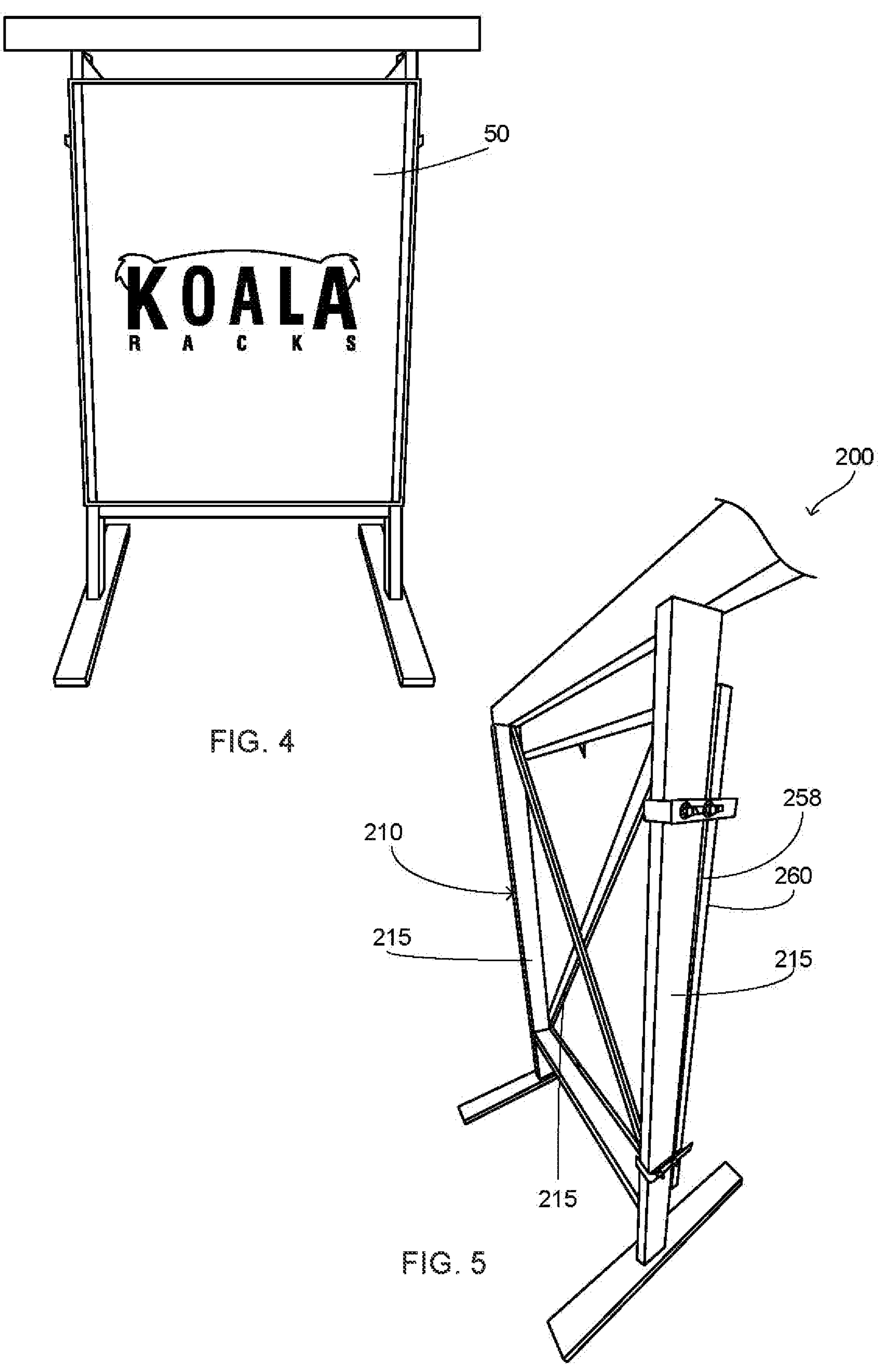
FIG. 4 is a front view of a tarp rack embodiment of the present invention.
FIG. 5 is a side perspective view of a tarp rack embodiment of the present invention.
Figure 6:
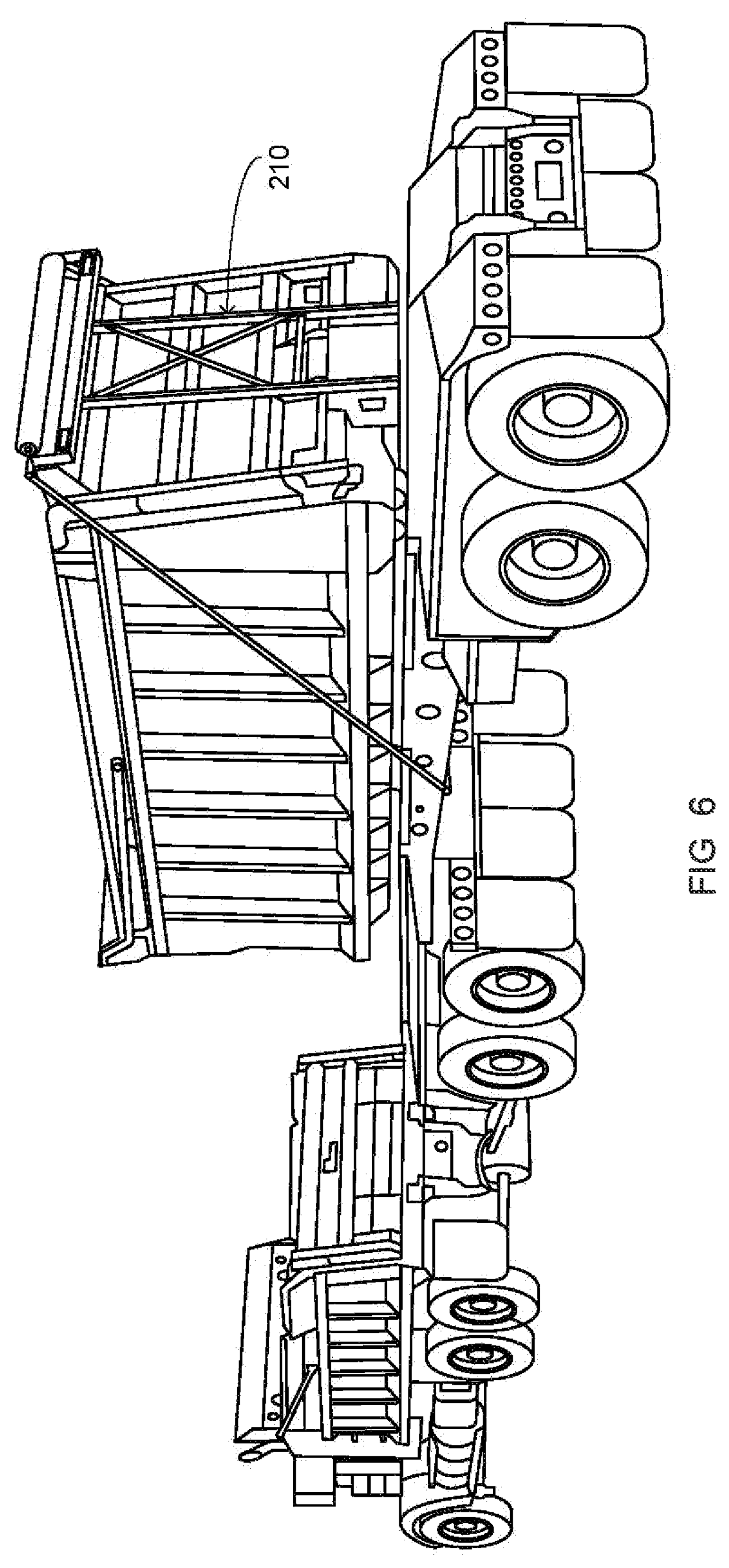
FIG. 6 is a perspective view of a tarp rack embodiment of the present invention on a trailer having a tarp rack.

Referring in particular to FIGS. 2,4 and 5 the tarp rack embodiment 200 of the advertising system 100 is illustrated therein. The tarp rack embodiment 200 is configured to be operably coupled to vehicles having a tarp covering the opening as is illustrated herein in FIG. 6. The tarp rack embodiment 200 includes frame 210 wherein frame 210 includes a plurality of support members 215 integrally secured to provide support for the advertising support member 50. The support members 215 are manufactured from a suitable rigid material such as but not limited to metal. While the support members 215 are illustrated herein as forming a particular shape for the frame 210, it is contemplated within the scope of the present invention that the frame 210 could include alternate quantities of support members 215 and be arranged to provide different shapes and sizes for the frame 210.

The frame 210 includes outer support tube 220 having an inner support tube 225 movably disposed therein. The inner support tube 225 includes a first portion 226 and second portion 227 that are movably coupled with spring member 228. The configuration of the inner support tube 225 allows lateral width adjustment for different tarp rack 299 sizes while maintaining the width of the frame 210 in order to have secured thereto the advertising support member 50. The inner support tube 225 has secured to the first portion 226 and second portion 227 opposing retention members 230,235. The retention members 230, 235 are configured to surroundably mount opposing ends of the tarp rack 299. While the retention members 230, 235 are illustrated having a particular shape, it is contemplated within the scope of the present invention that the retention members 230, 235 could be manufactured in alternate shapes and sizes and achieve the desired functionality discussed herein.

The advertising support member 50 is configured to be slidably inserted within the void 258 between frame 210 and sign support member 260. It is contemplated within the scope of the present invention that the advertising support member 50 could be lockably secured in position so as to inhibit unauthorized removal thereof.

Figure 3:
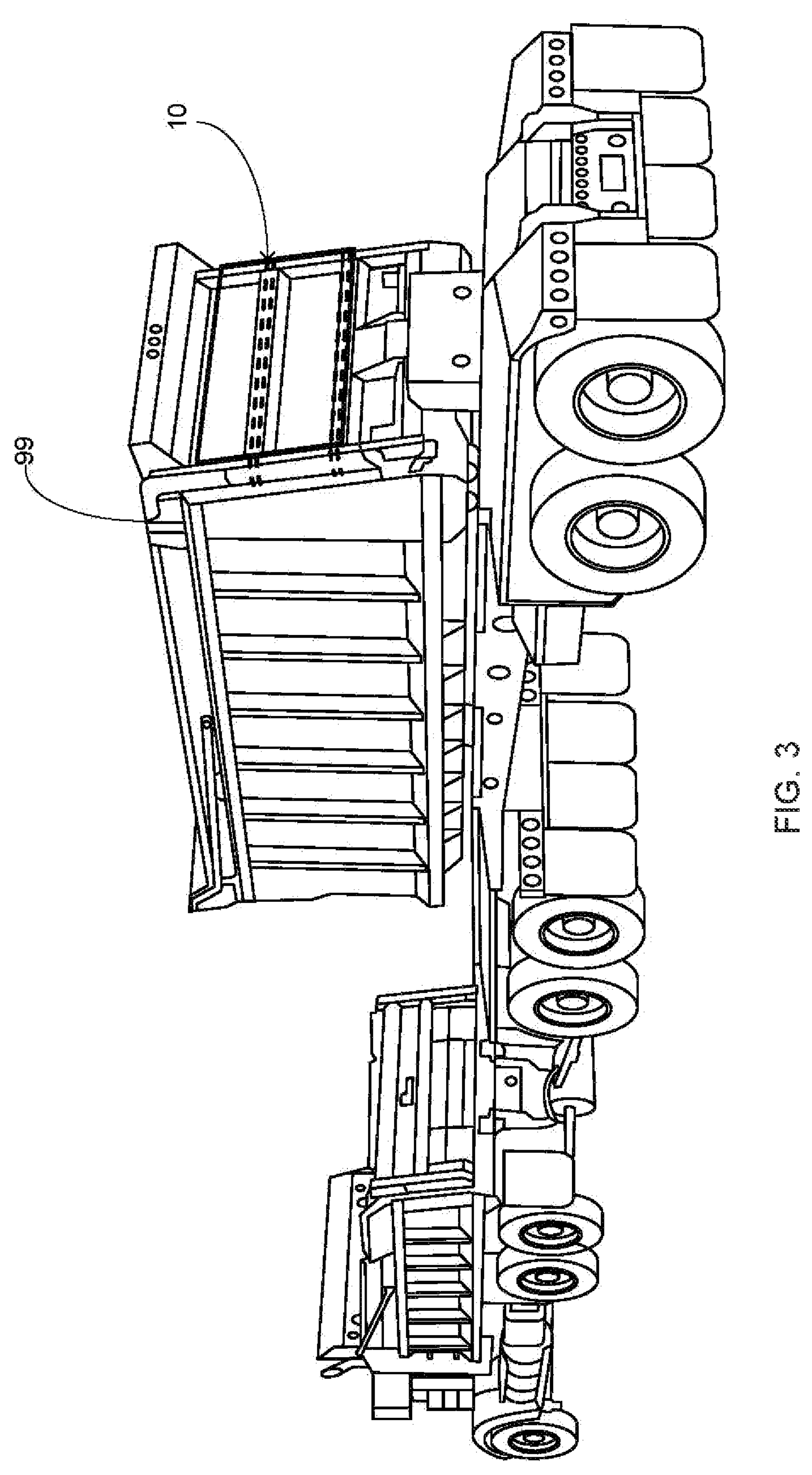
FIG. 3 is a perspective view of a transfer trailer with an embodiment of the present invention mounted to the tailgate thereof.

Referring in particular to FIGS. 1 and 3, the transfer box tailgate embodiment 10 of the advertising system 100 is illustrated therein. The transfer box tailgate embodiment 10 is configured to be secured to a tailgate 99 of a transfer box. The transfer box tailgate embodiment 10 includes sign support member 20 that is configured to receive therein and display the advertising support member 50. End 21 is configured to be lockable so as to inhibit unauthorized removal of the advertising support member 50. It is contemplated within the scope of the present invention that the end 21 could be configured with alternate elements in order to provide locking thereof. Secured to the sign support member 20 is outer tube assembly 30. The outer tube assembly 30 is manufactured from metal square tubing and is secured to the sign support member 20 utilizing suitable durable techniques. Movably disposed within the outer tube assembly 30 is inner tube member 40. The inner tube member 40 includes a first portion 41 and second portion 42 that are movably coupled with spring member 45. Secured to the inner tube member 40 on opposing ends thereof are the tailgate retention clamp members 60, 70. The tailgate retention clamp members 60,70 are configured to be positioned to releasably secure to the tailgate 99. The tailgate retention clamp members 60,70 are biasly forced towards each other with spring member 45. The tailgate retention clamp members 60, 70 mateably engage the sides of the tailgate 99 and clamp thereto providing retention of the transfer box tailgate embodiment 10 on the tailgate 99.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An advertising system that is operable to display advertising on a commercial vehicle wherein the advertising system comprises:

a support frame, said support frame having an upper horizontal support member, said support frame having a lower horizontal support member being parallel to said upper horizontal support member, said upper horizontal support member having a first end and a second end, said lower horizontal support member having a first end and a second end, said support frame having a first vertical support member, said first vertical support member being secured between said first end of said upper horizontal member and said first end of said lower horizontal member, said support frame having a second vertical support member, said second vertical support member being secured between said second end of said upper horizontal member and said second end of said lower horizontal member, said support frame having a void;

an advertising support member, said advertising support member being releasably secured within said void, said advertising support member having indicia and logos imprinted thereon;

a first attachment member, said first attachment member being secured to said upper horizontal support member proximate the first end thereof, said first attachment member having a first portion and a second portion;

a second attachment member, said second attachment member being secured to said upper horizontal support member proximate the second end thereof, said second attachment member having a first portion and a second portion; and wherein the first attachment member and second attachment member are moveable so as to releasably secure the advertising system to the commercial vehicle;

wherein said second portion of said first attachment member and said second portion of said second attachment member are parallel to the support frame and are configured to bias a portion of the commercial vehicle therebetween.

2. The advertising system that is operable to display advertising on a commercial vehicle as recited in claim 1, wherein said first portion of said first attachment member and said first portion of said second attachment member extend outward from said upper horizontal support member.

3. The advertising system that is operable to display advertising on a commercial vehicle as recited in claim 2, wherein said second portion of said first attachment member and said second portion of said second attachment member are perpendicular in shape and movably couped to the first portion of said first attachment member and said first portion of said second attachment member.

4. The advertising system that is operable to display advertising on a commercial vehicle as recited in claim 3, and further including a safety tether, said safety tether being operably coupled to said support frame and the commercial vehicle.

5. The advertising system that is operable to display advertising on a commercial vehicle as recited in claim 4, wherein the advertising system is operably coupled to a dump truck tailgate.

6. The advertising system that is operable to display advertising on a commercial vehicle as recited in claim 1, wherein the first attachment member is movable via sliding of the second portion relative of the first attachment member to the first portion of the first attachment member and the second attachment member is movable via sliding of the second portion of the second attachment member relative to the first portion of the second attachment member.

* * * * *